Jan. 6, 1942.     M. G. CROSBY     2,268,643
FREQUENCY MODULATION DISTANCE FINDER
Filed Oct. 25, 1939     2 Sheets-Sheet 1

Inventor
Murray G. Crosby
By
Attorney

Patented Jan. 6, 1942

2,268,643

UNITED STATES PATENT OFFICE 2,268,643

FREQUENCY MODULATION DISTANCE FINDER

Murray G. Crosby, Riverhead, N. Y., assignor to Radio Corporation of America, a corporation of Delaware Application October 25, 1939, Serial No. 301,293

16 Claims. (Cl. 250—1)

This invention relates to distance finders and especially to a distance determining device in which frequency modulated waves are propagated over direct and indirect paths and in which the difference in path length is indicated as a function of the phase shift of the wave travelling the indirect path.

The previous practice has been to radiate a wave and to measure the time required for the wave to travel to the reflecting object and back to a receiver. Knowing the time and the wave velocity, the distance of the object may be determined. The prior art systems have employed both pulse and continuous waves. The present invention improves the prior art systems, as will be hereinafter described.

The present invention has for one of its objects provision of means for detecting a phase shift, brought about by the difference of length of two paths travelled by a frequency modulated wave, to indicate distance thereby. Another object is to provide means for measuring the phase shift in a frequency modulated wave by converting the frequency modulation into amplitude modulation to indicate distance as a function of said amplitude modulation. An additional object is to provide means whereby the incoming wave controls the frequency of the outgoing wave.

Figure 1:
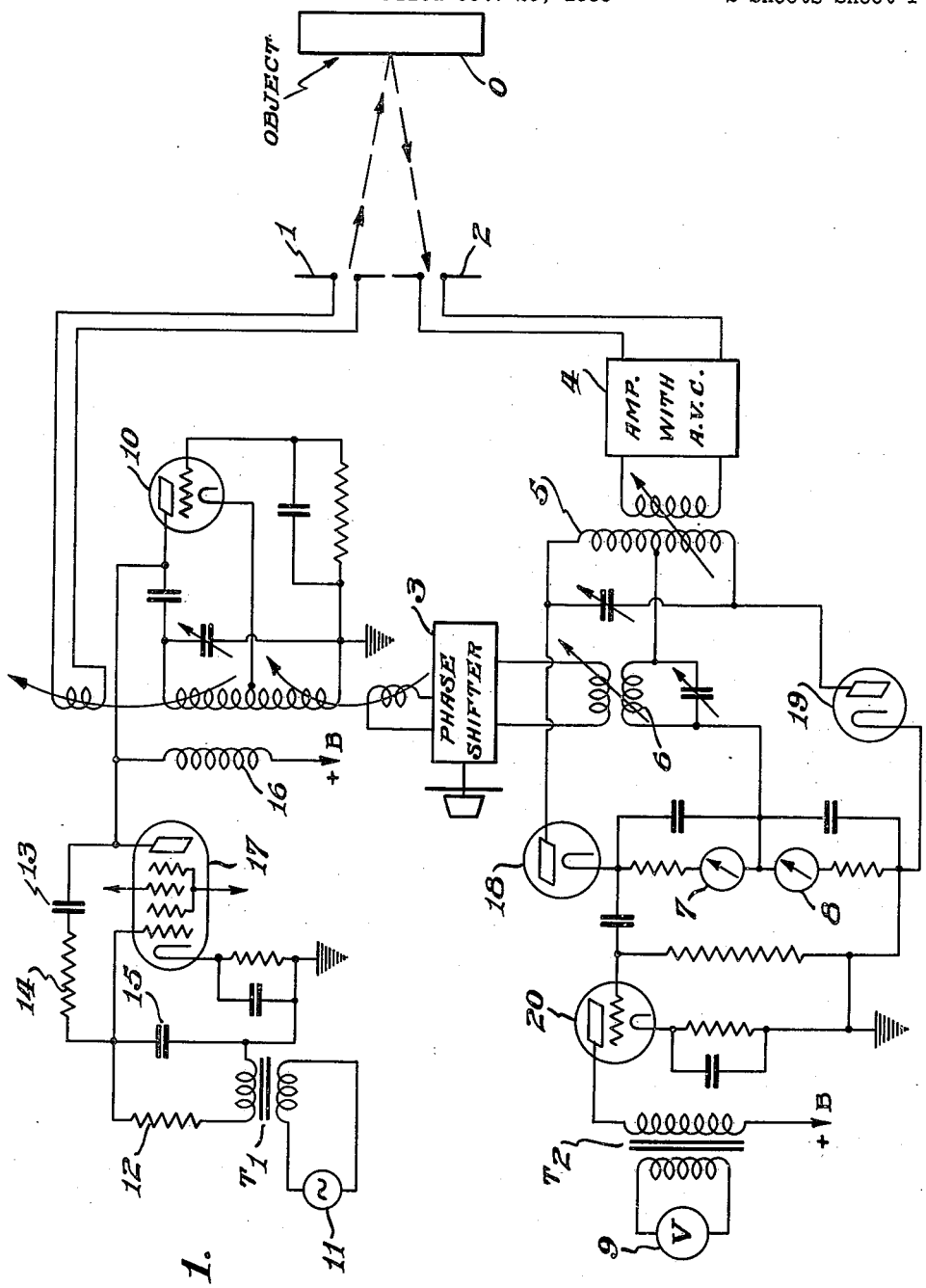
Figure 2:
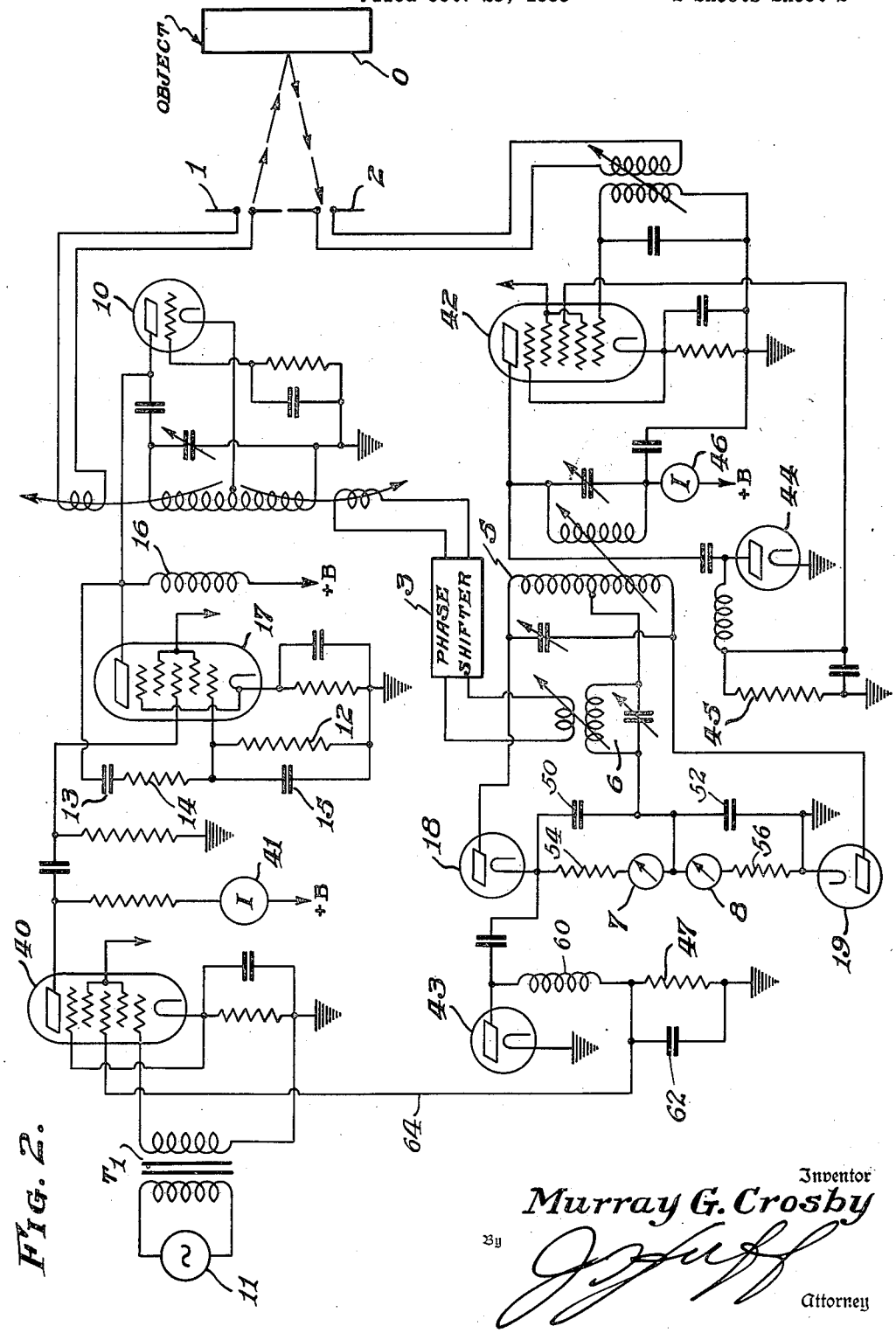

The invention will be described by referring to the accompanying drawings in which Figure 1 is a schematic circuit diagram of one embodiment of the invention; and Figure 2 is a schematic circuit diagram of a modification in which the outgoing wave is controlled by the incoming wave. In describing the circuits similar reference numerals will be applied to similar elements.

The circuit of Fig. 1 shows a specific embodiment in which the distance between an object 0 and the apparatus to the left of it is to be determined. A thermionic oscillator 10 radiates energy to object 0 by means of a suitable antenna 1. This energy is reflected by the object 0, picked up on an antenna 2 and amplified by an automatic volume controlled amplifier 4. The amplifier 4 feeds the reflected energy to differential detectors 18 and 19 by way of a push-pull transformer 5. Energy from the oscillator is also fed to the common leg of the differential detectors 18 and 19 by means of a transformer 6. The network, including the differential detectors 18, 19, push-pull transformer 5, and transformer 6, forms a frequency to amplitude converter which has a demodulated output wave. A variable phase shifter 3 is used to adjust the phase of the energy received direct from the oscillator 10. The oscillator 10 is frequency modulated by means of a reactance tube 17 which is modulated by means of a potential source 11 and transformer T. Capacitor 15 and a resistor 14 form the required phase shifter for the feedback voltage of the reactance tube. A blocking condenser 13 is connected between the resistor 14 and the anode of the reactance tube. A resistor 12 furnishes a D.-C. path from grid to ground and allows application of the modulating potentials to the control grid of the reactance tube. A radio frequency choke 16 is used to apply plate voltage to the reactance tube and the oscillator. An amplifier tube 20 amplifies the frequency modulation detected by detectors 18 and 19 and applies it to voltmeter 9 by means of transformer $T_2$. Milliammeters 7 and 8 provide an indication of the balance of the detector currents.

The operation of the circuit of Fig. 1 is as follows: A constant degree of frequency modulation is applied to the oscillator 10 by means of reactance tube 17 and modulation source 11. This frequency modulated wave is fed to the differential detectors through two paths. One of these paths is directly through the phase adjuster and the other is the path consisting of the radiation to and the reflection from object 0. This latter path constitutes a time delay circuit which imparts a phase change with change in frequency. Thus the reflected wave has its phase changed as the frequency is changed and the direct wave does not. The combination of these two waves will then vary in amplitude as the frequency is changed since their relative phase will vary. The length of time delay effected by the radiated and reflected path has the same effect on the sensitivity of the conversion of the frequency modulation to amplitude modulation as the length of the artificial line or retard circuit of the frequency modulation receiver described in applicant's U. S. Patent No. 2,230,212, issued on January 28, 1941, and entitled "Signal receiver." Thus, as the distance to the object varies, the degree with which the frequency modulation is detected by detectors 18 and 19 is varied and the modulation output fed to amplifier 20 and voltmeter 9 will be directly dependent upon the distance to the object. This allows a direct calibration of voltmeter 9 in terms of distance. The method of reading the distance would then be to first adjust the currents in meters 7 and 8 for balance by means of phase adjuster 3 and read the distance on the scale of the voltmeter 9, which may be calibrated in feet or meters.

An example will probably clarify the above explanation. Let the frequency of oscillator 10 be 300 kc. and the distance to the object be 300 meters. Since the wavelength of 300 kc. is 1000 meters, the total electrical length of the path from transmitting antenna to object to receiving antenna would be 600/1000 or 0.6 wavelength. Hence the wave traveling over this path would be retarded 0.6 wavelength or 216 degrees. If the frequency of oscillator 10 were changed momentarily to a frequency of 310 kc. the electrical length of the path would then be 600/967 or 0.62 wavelength. At this frequency the phase would then be retarded 223 degrees. Thus a change in frequency changes the phase of the energy received on antenna 2 with respect to that received directly from the oscillator through the phase adjuster. This change in phase with frequency causes the resultant of the two waves to vary in amplitude in accordance with the change in frequency. Hence by detecting this variation in amplitude for a given change in frequency a direct indication of the length of the retarding path may be obtained.

The circuit of Fig. 2 is similar to that of Fig. 1 except that improvements are added. The oscillator 10 is frequency modulated by a reactance tube 17 which is modulated by potentials from a source 11 through a transformer T1 and an amplifier tube 40. The reflected energy received on the antenna 2 is amplified by an amplifier 42 which is automatic volume controlled by means of the rectified energy from a diode resistor 45 in the circuit of a diode 44. The plate current meter 46 gives an indication of the strength of the reflected wave and would therefore give an indication of the coefficient of reflection from the object 0 for known distances. From this indication of the coefficient of reflection, a determination of the material of the object may be had. For instance, in the case of the altimeter, the coefficient of reflection of sea water is 90 percent, whereas that of Long Island ground is 50 percent. Such a change in the efficiency of reflection would give ample change in the strength of the reflected wave to indicate the nature of the terrain.

The discriminator of the receiver includes a pair of diodes 18, 19. The anodes of the diodes are connected to opposite terminals of the oscillatory circuit 5. The cathodes are connected together by series capacitors 50, 52. The cathodes are also connected to resistors 54, 56 which terminate in meters 7 and 8. The meters and capacitors are connected together and are connected through the tuned circuit 6 to the midpoint of the oscillatory circuit to complete the discriminator network.

A third diode 43 is connected through a capacitor 58 to the cathode of the upper diode 18. The cathode of the third diode is grounded. The anode of the third diode is connected through a choke 60 and resistor 47 to ground. The resistor 47 is shunted by a capacitor 62. The junction of the choke 60 and resistor 47 is connected through a lead 64 to a control grid of the amplifier 40. The circuit of the third diode is completed by grounding the cathode of the lower diode 19. In the operation of the discriminator, the received phase or frequency modulated oscillations are converted into amplitude modulations. The amplitude modulations are detected or rectified by the third diode and the rectified currents are applied through the amplifier 40 to control the transmitter as hereinafter described.

The reflected and direct energy in the circuit of Fig. 2 are combined in the same manner as in the circuit of Fig. 1, but the detected frequency modulation output is utilized in a different manner. Instead of reading the amplitude of the detected frequency modulation, the detected output is rectified and the rectified energy is used to control the gain of the amplifier 40, which applies the modulating potentials to the frequency modulating reactance tube. The plate current of this amplifier is then read by means of meter 41 to give an indication of the amplitude of the frequency modulation detected by detectors 18 and 19. These detectors 18, 19, together with the transformers 5, 6 and associated connections, form a means for converting frequency modulated currents into amplitude modulated currents, and finally into demodulated currents. The meter may be placed in the screen or cathode lead in place of the connection shown. This manner of using the detected frequency modulation output to vary the amount of applied frequency modulation would increase the range of the distance meter since the output of the detectors could not then drive the indicating meter off scale. The scale would then be exponential and would have a more equal sensitivity all over its range.

In either of the circuits of Figs. 1 and 2, the fact that the variable phase adjuster 3 is in the path of the directly applied wave adds time delay to that path so that the calibration will be slightly upset unless the error introduced by the phase shifter is taken into account in making the reading. This error would depend upon the setting of the phase shifter. Hence the dial of the phase shifter could be calibrated so that for each reading of the dial a given amount would be added to or subtracted from the distance reading. Another method is to gang a potentiometer to the shaft of the phase adjuster and have this potentiometer insert a compensating voltage in the circuit of the meter which indicates the distance. The distance meter then gives a direct reading at all times.

Although I have shown these circuits with tunings that might imply that the waves radiated were radio frequency waves, I do not intend that the invention should be limited to radio waves, but should include sound waves as well. In the case of sound waves, a sound projector and receiver are used in place of the antenna. Various applications will require various frequencies. In this respect a flexibility of design is available since either sound waves, with a velocity of 1100 feet per second, or radio waves, with a velocity of 186,000 miles per second, may be used. Thus, by varying the frequency and choosing the type of wave, the number of wavelengths existing in a given distance may be varied to provide the required sensitivity of the indication.

It is well known to the art that a frequency modulated wave may be formed by generating phase modulation. However, it might be well to mention that the frequency modulated oscillator of this invention may be replaced by a source of oscillations which is phase modulated. The rest of the circuit remains unaltered since the wave generated by the phase modulation system can be made the same as that generated by the frequency modulation system by applying the proper frequency correction circuits to the modulating potentials.

It is not imperative that the frequency modulation be applied in the form of an alternating wave. Manual variation of the frequency may also be applied. For instance in the case of Fig. 1, the reactance tube 17 can be eliminated and oscillator 10 may then be varied in frequency by manually varying its tuning. The change in the detector currents as indicated by meters 7 and 8 for a given frequency variation gives a measure of the distance. The tuning dial of the oscillator 10 may be calibrated in distance for a given detector current variation. Another method consists in calibrating the detector current meter in terms of distance for a given frequency change of the oscillator. With such a manually-operated device, longer distances produce a large detector current change for a given frequency change and the shorter distances produce a lesser detector current change for the given frequency change. Likewise, the longer distances require a greater frequency change for a given detector current change and the shorter distances require a lesser frequency change for the given detector current change.

I claim as my invention:

1. A distance determining device including a wave transmitter, means for frequency modulating said wave, means for receiving said wave after reflection from an object whose distance is to be determined, means connected to said receiver for converting the received frequency modulated wave into an amplitude modulated wave means for demodulating said amplitude modulated wave, means connected to said converting means for amplifying said demodulated wave, and an indicator connected to said amplifier and responsive to the thus detected wave to indicate the distance of said object as a function of the amplitude of said demodulated wave.

2. A distance measuring device including a source of waves, a modulator connected to said source for frequency modulating said waves, means connected to said source for radiating said frequency modulated waves, means for receiving said waves after reflection from an object whose distance is to be measured, a balanced detector connected to said receiver, means for applying the received reflected waves and waves directly from said source to said detector to convert the varying frequency to varying amplitude, said converting means including an amplitude detector for demodulating the varying amplitude waves, and an indicator effectively connected to said amplitude detector and arranged to indicate distance as a function of the amplitude of the detected waves.

3. A distance measuring device including, in combination, a generator of oscillatory currents, a reactance tube connected to said generator, a source of low frequency currents, means for applying said low frequency currents to said reactance tube so that the frequency of said oscillatory currents is varied, means for applying said oscillatory currents of varying frequency to a radiator whereby waves are radiated, means for receiving said waves after reflection, a converter connected to said receiving means for changing said frequency varying waves into amplitude varying waves, said converter including means for demodulating said amplitude varying waves, a phase shifter including connections to said converter and generator, and an indicator effectively connected to said converter for indicating the distance of said reflection as a function of the amplitude of said demodulated amplitude waves.

4. A distance determining device including a wave transmitter, means connected to said transmitter for varying the frequency of said wave, means for receiving said wave after reflection from an object whose distance is to be indicated, means for applying directly a wave from said transmitter to said receiver, means connected to said receiver for deriving from said directly applied and received reflected waves a controlling current, means connecting said controlling current deriving means and frequency varying means for applying said controlling current to said frequency varying means to control the frequency variation as a function of the received wave, and means for indicating the distance of said object as a function of said controlling current.

5. A distance determining device including a wave transmitter, means connected to said transmitter for varying the frequency of said wave, means for receiving said wave after reflection from an object whose distance is to be indicated, means for converting said received frequency varying wave into an amplitude varying wave, means for deriving from said amplitude varying wave a controlling current, means for applying said controlling current to said frequency varying means to control the frequency variation as a function of the received wave, and means for indicating the distance of said object as a function of said controlling current.

6. A distance measuring system including a source of frequency modulated waves, means for radiating said frequency modulated waves, means for receiving said waves after reflection from an object whose distance is to be measured, a frequency to amplitude wave converter connected to said receiving means and including means for demodulating said amplitude wave, means for applying said reflected waves and for directly applying waves from said source to said converter, and means for applying said demodulated waves to said course to control the frequency modulation as a function of the distance of said wave reflecting object.

7. In a system of the character of claim 6, means for shifting the phase of said directly applied waves.

8. In a system of the character of claim 6, an indicator responsive to said demodulated waves for indicating the distance of said reflecting object.

9. A distance measuring system including a source of frequency modulated waves, means for radiating said waves, means for receiving said waves after reflection from an object whose distance is to be measured, a balanced detector connected to said receiving means, means for applying said received waves and waves direct from said source to said detector to establish demodulated currents, means connected to said balanced detector for deriving controlling currents from said demodulated currents and for applying said controlling currents to said source for controlling the frequency modulation at said source, and an indicator responsive to said controlling currents for measuring the distance of said object as a function of said controlling currents.

10. A distance measuring system including a source of frequency modulated waves, means for radiating said waves, means for receiving said waves after reflection from an object whose distance is to be measured, a detector connected to said receiving means, means for applying said received waves and waves direct from said source to said detector to establish demodulated currents, means connected to said detector for deriving controlling currents from said demodulated currents and for applying said controlling currents to said source for controlling the frequency modulation at said source, and an indicator responsive to said controlling currents for measuring the distance of said object as a function of said controlling currents.

11. The method of measuring distance which includes transmitting a wave, varying the frequency of said wave, receiving said wave directly and after reflection, combining the direct and reflected waves, deriving a voltage from said combined waves, and utilizing said voltage to control the frequency band width of the transmitted wave.

12. The method of measuring distance which includes transmitting a wave, varying the frequency of said wave, receiving said wave after reflection from an object whose distance is to be measured, applying directly the transmitted wave to said received wave so that the resultant wave varies in amplitude, deriving a controlling voltage from said resultant wave, utilizing said voltage to control the frequency band width of the transmitted wave, and indicating said distance as a function of said controlling voltage.

13. The method of measuring distance which includes transmitting a wave, varying the frequency of said wave, receiving said wave after reflection from an object whose distance is to be measured, applying directly the transmitted wave to said received wave so that the resultant wave varies in amplitude, deriving a controlling voltage from said resultant wave, and utilizing said voltage to control the frequency band width of the transmitted wave.

14. The method of measuring distance which includes transmitting a wave, varying the frequency of said wave, receiving said wave directly and after reflection, combining the direct and reflected waves, deriving a voltage from said combined waves, and utilizing said voltage to narrow the frequency band width of the transmitted wave as the measured distance increases.

15. The method of measuring distance which includes transmitting a wave, varying the frequency of said wave, receiving said wave directly and after reflection, combining the direct and reflected waves, deriving a voltage from said combined waves, and utilizing said voltage to diminish the frequency band width of the transmitted wave as the measured distance increases.

16. The method of measuring distance which includes transmitting a wave, varying the frequency of said wave, receiving said wave directly and after reflection, combining the direct and reflected waves, deriving a voltage from said combined waves, utilizing said voltage to narrow the frequency band width of the transmitted wave as the distance increases, and determining said distance as a function of said voltage.

MURRAY G. CROSBY.